(12) United States Patent
Zhu

(10) Patent No.: US 8,251,728 B2
(45) Date of Patent: Aug. 28, 2012

(54) CARD EDGE CONNECTOR WITH RETAINING DEVICE

(75) Inventor: Jian-Kuang Zhu, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 51 days.

(21) Appl. No.: 12/978,349

(22) Filed: Dec. 23, 2010

(65) Prior Publication Data

US 2011/0151702 A1 Jun. 23, 2011

(30) Foreign Application Priority Data

Dec. 23, 2009 (CN) .......................... 2009 2 0318120

(51) Int. Cl.
*H01R 13/62* (2006.01)
(52) U.S. Cl. ...................................................... 439/328
(58) Field of Classification Search .................. 439/328, 439/326, 637, 540.1, 64, 92
See application file for complete search history.

(56) References Cited

U.S. PATENT DOCUMENTS

| | | | |
|---|---|---|---|
| 6,042,411 A | 3/2000 | Hai | |
| 6,164,998 A * | 12/2000 | Poi et al. .................... | 439/326 |
| 6,276,951 B1 * | 8/2001 | Chen et al. .................... | 439/327 |
| 6,478,592 B1 * | 11/2002 | Hu et al. ........................ | 439/159 |
| 6,796,825 B2 * | 9/2004 | Wang ............................. | 439/326 |
| 6,939,156 B2 * | 9/2005 | Lee ............................... | 439/328 |
| 7,048,565 B2 * | 5/2006 | Lin ................................ | 439/326 |
| 7,338,307 B2 * | 3/2008 | Zhang et al. .................. | 439/326 |
| 2004/0092148 A1 * | 5/2004 | Yu ................................. | 439/326 |
| 2006/0094277 A1 * | 5/2006 | Yang et al. .................... | 439/328 |
| 2010/0003856 A1 * | 1/2010 | Fu ................................. | 439/637 |
| 2011/0059629 A1 * | 3/2011 | Chen .............................. | 439/64 |

\* cited by examiner

*Primary Examiner* — Tulsidas C Patel
*Assistant Examiner* — Phuongchi Nguyen
(74) *Attorney, Agent, or Firm* — Wei Te Chung; Andrew C. Cheng; Ming Chieh Chang

(57) ABSTRACT

A card edge connector includes an elongated housing defining a mating cavity extending along a longitudinal direction and a pair of arms disposed at opposite ends of the mating cavity. Each arm has a locking arm and a stopping arm spaced from each other while commonly extending forward from the housing. A receiving space is defined between the pair of locking arms for receiving said electrical card while the stopping arm is located at a lateral side of the locking arm beyond said receiving space. A pair of retaining devices, each comprises a base plate attached to the locking arm and a retaining portion extending toward the housing and secured in the housing. A blocking portion extends outwardly from the base plate of the retaining device and stands at an exterior side of the stopping arm for preventing the locking arm from moving inwardly overly.

6 Claims, 7 Drawing Sheets

CARD EDGE CONNECTOR WITH RETAINING DEVICE

BACKGROUND OF THE INVENTION

1. Field of the Invention

The present invention relates to a card edge connector, and in particular to a card edge connector provided with a pair of retaining devices thereon.

2. Description of the Related Art

U.S. Pat. No. 6,042,411 issued to Choy on Mar. 28, 2000 discloses a conventional card edge connector for connecting an electrical card to a circuit board so as to realize electrical connection therebetween. The card edge connector includes an insulative housing defining an elongated central slot therein and provided with a plurality of terminals at opposite sides thereof for receiving the electrical card therein. A pair of latching arms are arranged at opposite longitudinal ends of the insulative housing for locking with the electrical card. Each latching arm extends forward from the insulative housing and defines a locking portion at a distal end thereof for retaining the electrical card. A stopping wall extends forward from a lateral side of the latching arm and spaced to the latching arm for preventing over-movement of the latching arm when the latching arm moves outwardly. However, if the latching arm moves inwardly by mistake, as there is no stopping portion at an inner side of the latching arm to stop the movement, which will result breakage of the latching arm. Obviously, an improved card edge connector is highly desired to overcome the aforementioned problem.

SUMMARY OF THE INVENTION

Accordingly, an object of the present invention is to provide a card edge connector which can prevent the latching arm from breakage.

In order to achieve the object set forth, a card edge connector for connecting an electrical card to a printed circuit board comprises an elongated housing defining a mating cavity extending along a longitudinal direction and a pair of arms disposed at opposite ends of the mating cavity. Each arm has a locking arm and a stopping arm spaced from each other while commonly extending forward from the housing. A receiving space is defined between the pair of locking arms for receiving said electrical card while the stopping arm is located at a lateral side of the locking arm beyond said receiving space. A plurality of contacts are divided into upper row contacts and lower row contacts, and respectively secured on opposite sides of the mating cavity. A pair of retaining device, each comprises a base plate attached to the locking arm and a retaining portion extending toward the housing and secured in the housing. A blocking portion extends outwardly from the base plate of the retaining device and stands at an exterior side of the stopping arm for preventing the locking arm from moving inwardly overly.

Other objects, advantages and novel features of the invention will become more apparent from the following detailed description of the present embodiment when taken in conjunction with the accompanying drawings.

DETAILED DESCRIPTION OF THE INVENTION

Figure 1:
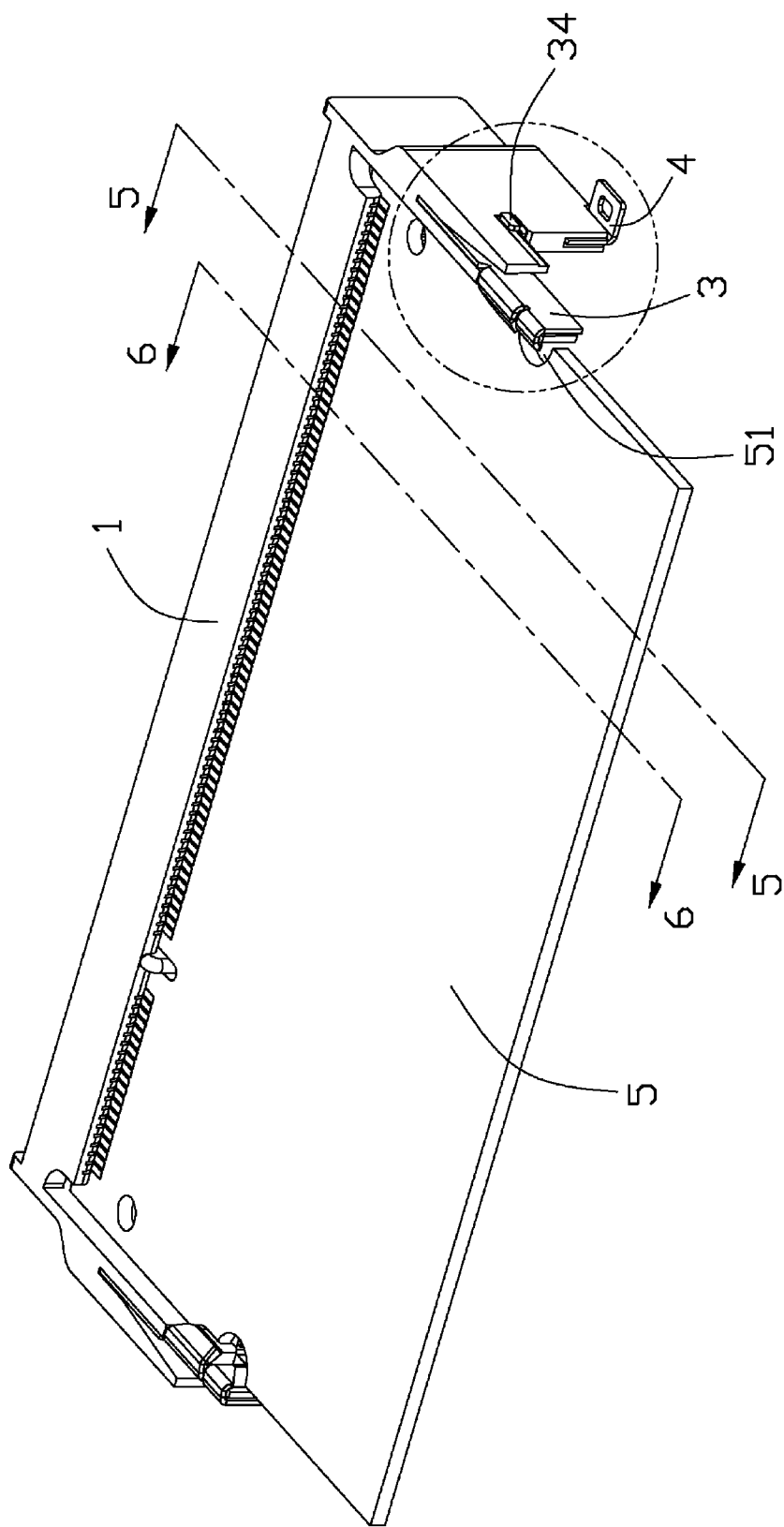
FIG. 1 is a perspective view of a card edge connector in accordance with the present invention, wherein an electrical card is inserted into the card edge connector.
Figure 2:
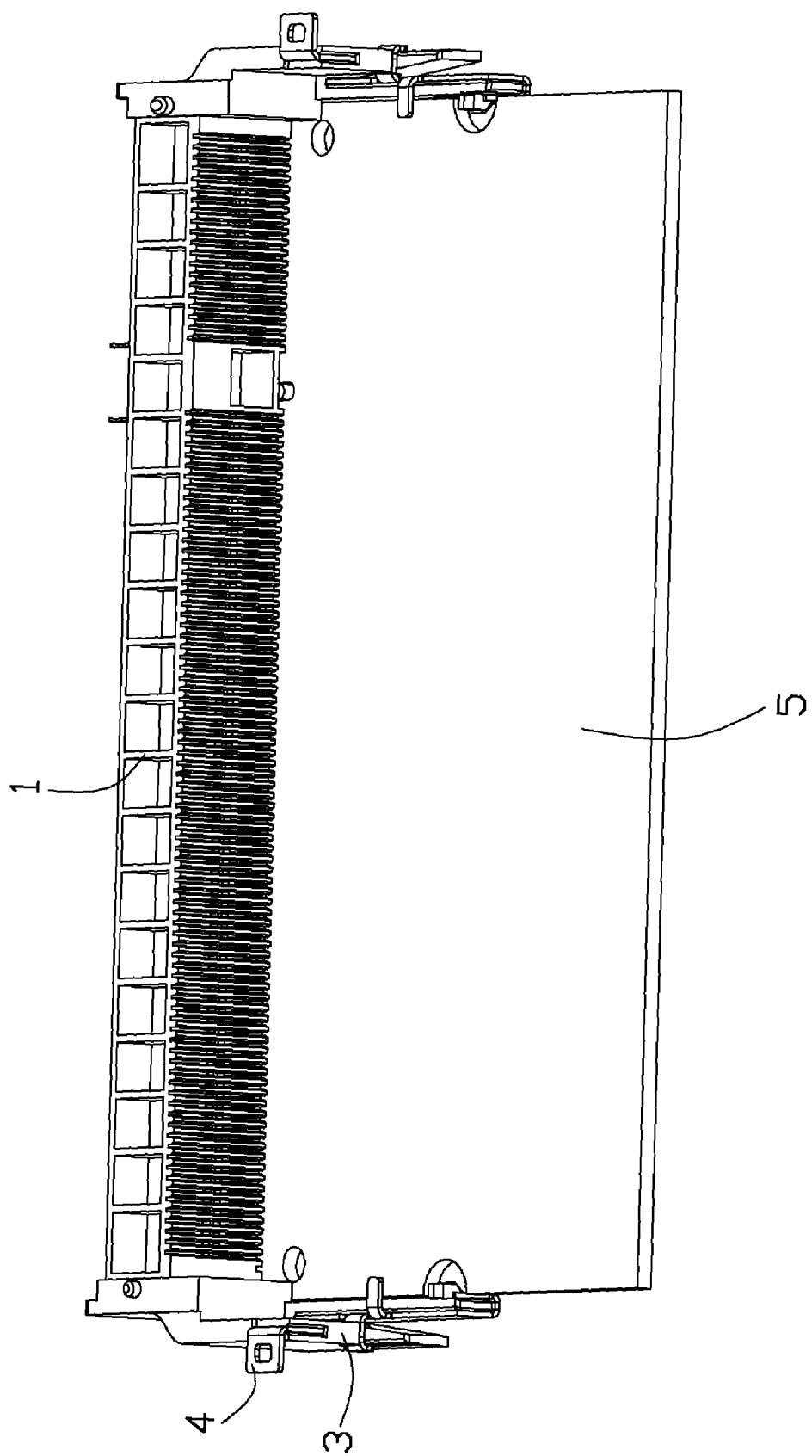
FIG. 2 is another perspective view of the card edge connector shown in FIG. 1 with the electrical card inserted therein.
Figure 3:
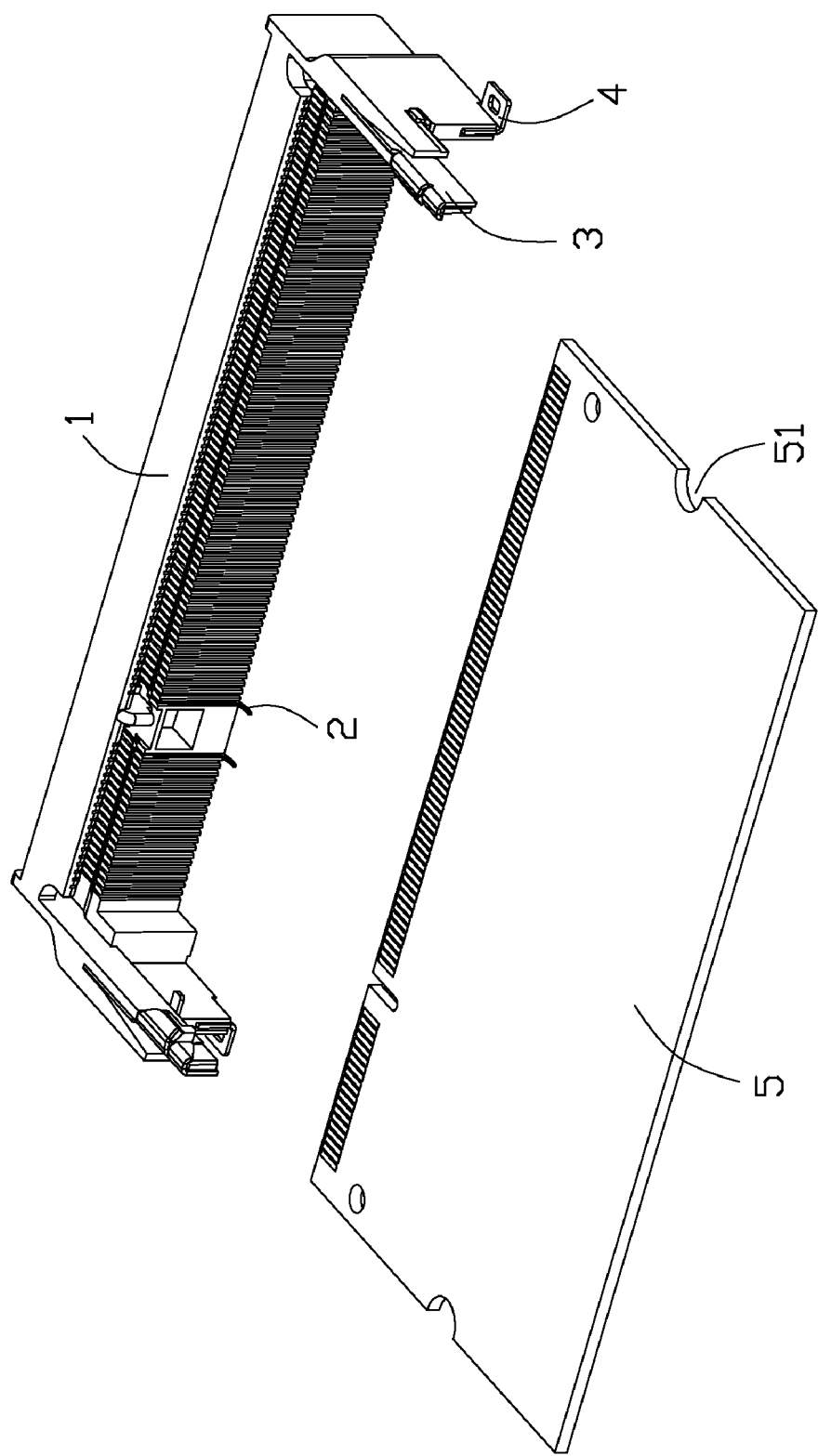
FIG. 3 is a perspective view of the card edge connector shown in FIG. 1, wherein the electrical card is drawn out of the card edge connector.

Reference will now be made to the drawing figures to describe a preferred embodiment of the present invention in detail. Referring to FIG. 1 to FIG. 3, a card edge connector 100 according to the preferred embodiment of the present invention is provided and comprises an insulative housing 1 with a plurality of conductive terminals 2 received therein and a pair of retaining devices 3 and soldering pads 4 assembled on the insulative housing 1.

Figure 4:
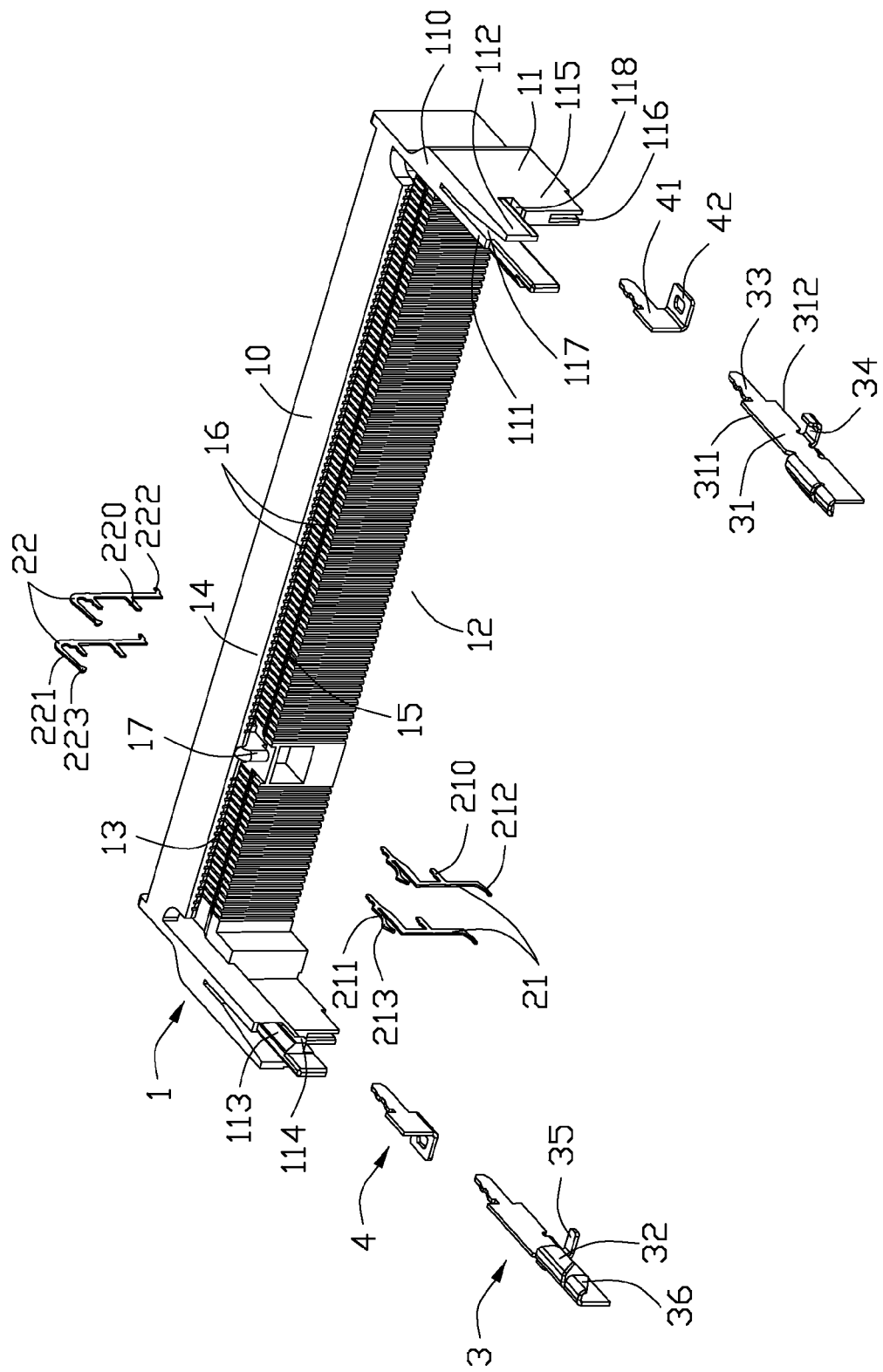
FIG. 4 is an exploded perspective view of the card edge connector shown in FIG. 1.

Referring to FIG. 4, the insulative housing 1 comprises an elongated base portion 10 and a pair of arms 11 disposed at opposite longitudinal ends of the base portion 10. A mating groove 13 is defined along a longitudinal direction of the base portion 10 and opened forwardly for receiving a front edge of an electrical card 5 therein. Further, a receiving space 12 is defined between the pair of arms 11 for receiving and holding the electrical card 5. An upper wall 14 and a lower wall 15 are respectively formed at opposite sides of the mating groove 13, on which a plurality of terminal grooves 16 are defined for receiving said conductive terminals 2. A key 17 for cooperating with a notch defined at the front edge of the electrical card 5 is formed in the mating groove 13 adjacent to one of the arms 11 thereby dividing the mating groove 13 into two separated parts. Each arm 11 comprises a body portion 110 jointed with the base portion 10, a locking arm 111 and a stopping arm 112 spaced from each other but commonly extending forward from the body portion 110, and a supporting portion 115 unitarily extending forward from the body portion 110 but spaced to the stopping arm 112 thereby leaving an interval 118 therebetween. As the stopping arm 112 locates at an outside of the locking arm 111, which can prevent the locking arm 111 moving outwardly overly. Each locking arm 111 forms a guiding portion 113 at a front inner side thereof for guiding the electrical card 5 to a retained position, and a locking portion 114 extending downwardly from the guiding portion 113 to lock with an aperture defined on a lateral edge of the electrical card 5. A receiving slot 116 further extends rearward from a front face of the supporting portion 115 for receiving the soldering pad 4.

Figure 5:
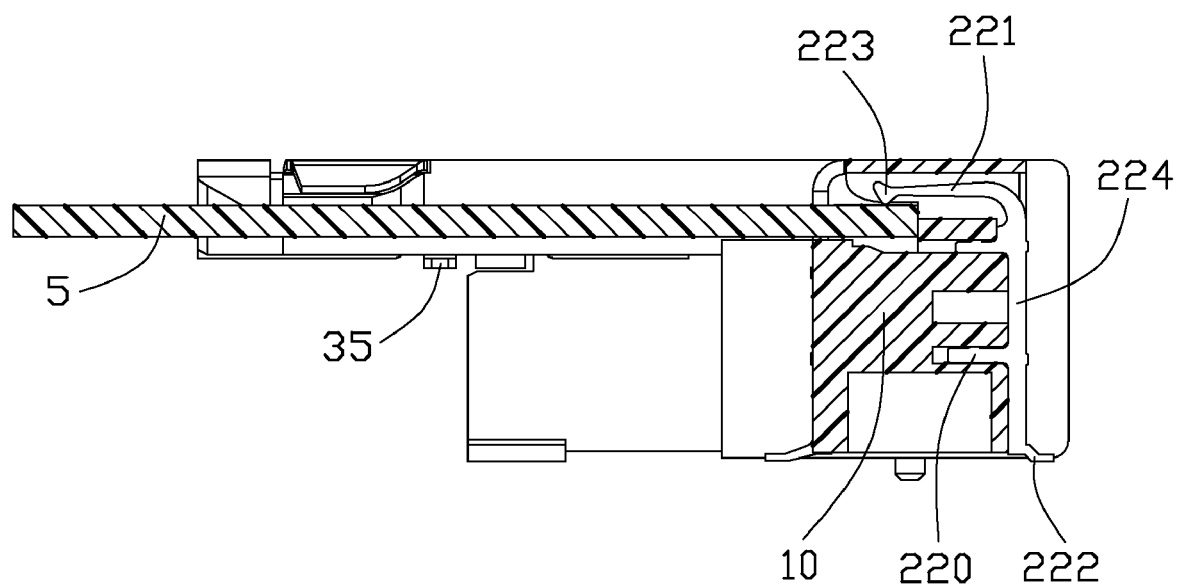
FIG. 5 is a cross-sectional view of the card edge connector shown in FIG. 1 along line 5-5.
Figure 6:
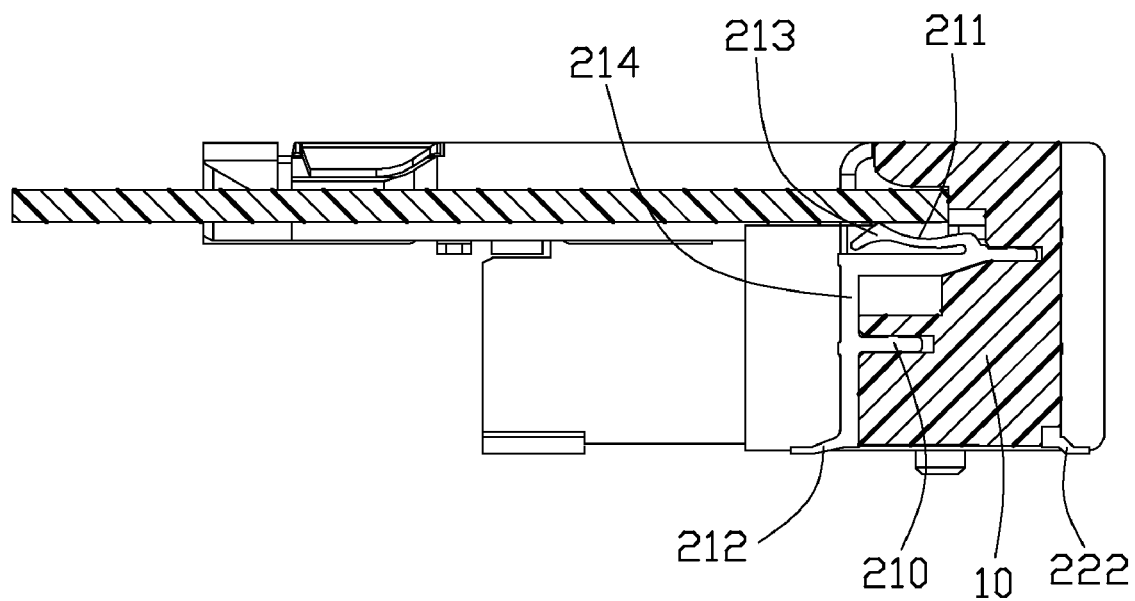
FIG. 6 is a cross-sectional view of the card edge connector shown in FIG. 1 along line 6-6.

Referring to FIG. 4 to FIG. 6, the extending direction of the arms 11 is defined as a mating direction. It is clearly shown that the upper wall 14 is shorter than the lower wall 15 in the mating direction thereby forming a step configuration facility the insertion of the electrical card 5. The conductive terminals 2 are divided into a row of upper terminals 22 and a row of lower terminals 21 and respectively received in the upper wall 11 and lower wall 12 for electrically contacting with the electrical card 5. The upper terminals 22 are inserted into the terminal grooves 16 defined on the upper wall 14 from a rear side of the insulative housing 1, and each upper terminal 22 comprises an elongated body portion 224, a pair of retaining arms 220 perpendicularly extending forward from the body portion 224 and secured in the insulative housing 1, a contacting arm 221 extending upward and forward from an upper end of the body portion 224 and projecting into the mating groove 13 to form a contacting point 223, and a solder portion 222 extending downward and rearward from a lower end of the body portion 224. The lower terminals 21 are inserted into the terminal grooves 16 defined on the lower wall 15 from a front side of the insulative housing 1, and each lower terminal 21 comprises an elongated body portion 214, a pair of retaining arms 210 perpendicularly extending rearward from the body portion 214 and secured in the insulative housing 1, a contacting arm 211 extending upward and forward from a front end of the upper retaining arm 210 and projecting into the mating groove 13 to form a contacting point 213, and a solder portion 212 extending downward and forward from a lower end of the body portion 214.

Figure 7:
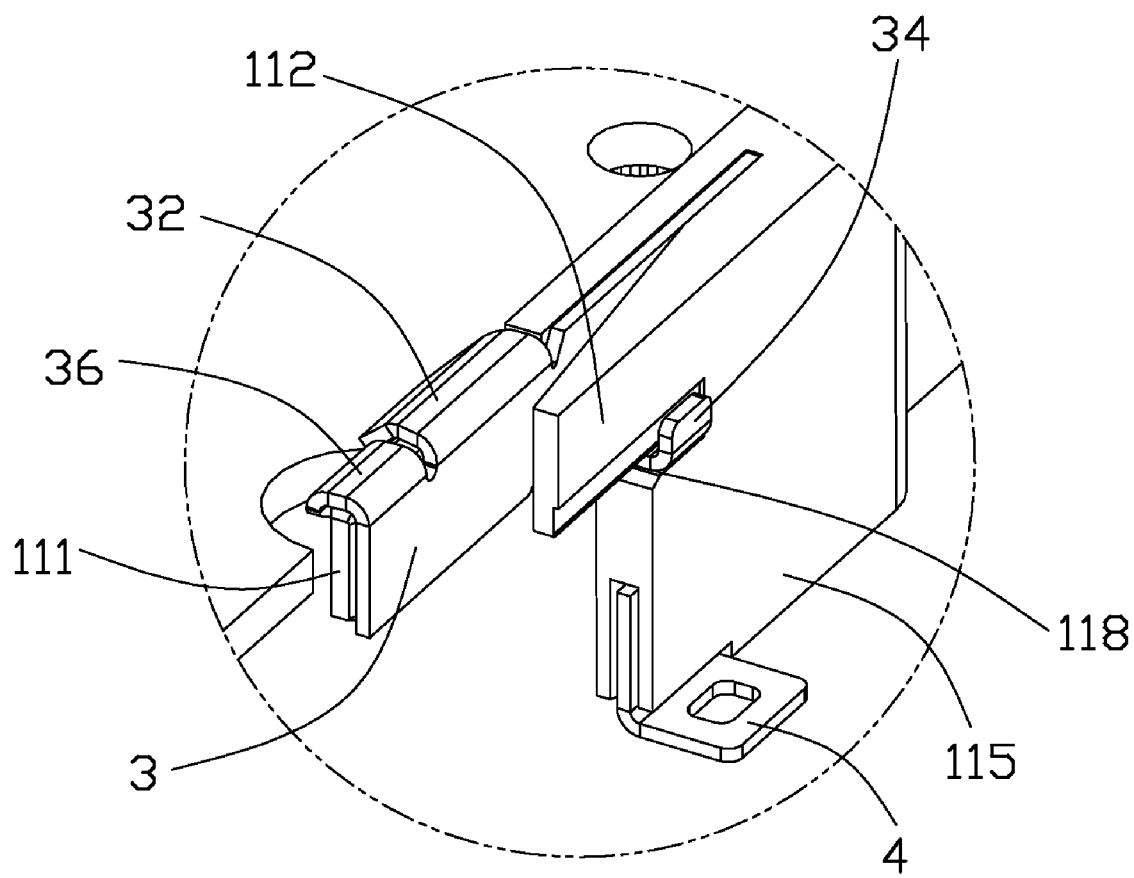
FIG. 7 is a partly amplified view of the card edge connector shown in FIG. 1.

Referring to FIG. 4 and FIG. 7, each retaining device 3 is made by a metal piece, and comprises an elongated base plate 31 which respectively form an upper edge 311 and a lower edge 312 at opposite sides thereof, and a retaining portion 33 extending from a rear end of the base plate 31 with a plurality of tips thereon. The retaining device 3 is assembled on the arm 11 with the base plate 31 attached to an outer side of the locking arm 111 and the retaining portion 33 fixed in a passageway 117 defined between the locking arm 111 and the stopping arm 112. A hook portion 36 and a guiding plate 32 are successively formed on a front end of the upper edge 311 and bend inwardly for respectively engaging with the front inner side of the locking arm 111 and tightly attached to the guiding portion 113. A holding portion 35 perpendicularly extends from a middle portion of the lower edge 312 and projects into the receiving cavity 12 for holding the electrical card 5 when the electrical card 5 moves downwardly overly, which can ensure a steadily electrical connection between the electrical card 5 and the card edge connector 100. A blocking portion 34 is successively formed on the middle portion of the lower edge 312 and bent outwardly and then upwardly. The blocking portion 34 runs through the interval 118 and located at a lateral side of the stopping arm 112 for preventing the locking arm 111 from moving inwardly overly or moving upwardly overly, which can prevent breakage of the locking arm 111.

The soldering pad 4 is also made by a metal piece and comprises a fixing portion 41 received in the receiving slot 116 and a soldering portion 42 projecting outwardly for mounting onto a printed circuit board.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card edge connector for connecting an electrical card to a printed circuit board comprising:
   an elongated housing defining a mating cavity extending along a longitudinal direction and a pair of arms disposed at opposite ends of the mating cavity, each arm having a locking arm and a stopping arm spaced from each other while commonly extending forward from the housing, a receiving space being defined between the pair of locking arms for receiving said electrical card while the stopping arm located at a lateral side of the locking arm beyond said receiving space;
   a plurality of contacts, divided into upper row contacts and lower row contacts, respectively secured on opposite sides of the mating cavity;
   a pair of retaining device, each comprising a base plate attached to the locking arm and a retaining portion extending toward the housing and secured in the housing;
   wherein a blocking portion extends outwardly from the base plate of the retaining device and stands at an exterior side of the stopping arm for preventing the locking arm from moving inwardly overly; wherein
   the blocking portion surrounds a bottom edge of the stopping arm; wherein
   a pair of supporting portions unitarily extend from opposite ends of the housing and located under the corresponding arms to support the card edge connector standing on said printed circuit board, and an interval is defined between corresponding stopping arm and the supporting portion for receiving said blocking portion; wherein
   a receiving slot is defined on a front face of the supporting portion and extends rearward for receiving a soldering pad therein; wherein
   each of said upper row contact and lower row contact respectively comprise a body portion and at least one retaining portion extending from the body portion, the upper row contact further comprises a contacting portion extending forward from an end of the body portion, while the lower row contact further comprises a contacting portion extending forward from an end of the at least one retaining portion; wherein
   the upper row contacts are inserted into housing from a rear side while the lower row contacts are inserted into the housing from a front side.

2. The card edge connector as described in claim 1, wherein the retaining plate defines an upper edge and a lower edge, said blocking portion extends from the lower edge of the retaining plate.

3. The card edge connector as described in claim 2, wherein a holding portion also forms at the lower edge of the retaining plate and extends reversely with regard to the blocking portion toward said receiving space.

4. The card edge connector as described in claim 3, wherein a hook portion and a guiding plate are successively formed on a front end of the upper edge and bend inwardly for respectively engaging with a front inner side of the locking arm.

5. The card edge connector as described in claim 4, wherein a guiding portion is formed on the locking arm and enclosed by the guiding plate.

6. A card edge connector comprising:
   an insulative housing defining an elongated base with a slot therein for receiving a daughter card, and a pair of arms unitarily extending forwardly from two opposite ends of the base;
   a plurality of contacts disposed in the housing and by two sides of the slot;
   each of said arms defining an inner locking arm and an outer stopping arm with a gap therebetween in a lateral direction;
   a locking portion formed on the locking arm; and
   a pair of metallic retaining devices assembled to the housing, defining an elongated base intimately along an exterior face of the inner locking arm, and essentially grasping the corresponding locking arms, respectively; wherein each of said retaining devices includes an inwardly extending holding portion so as to cooperate with the corresponding locking portion to define a receiving space therebetween in a vertical direction perpendicular to said lateral direction, for restraining said daughter card in said vertical direction; wherein said holding portion extends intimately below the locking arm; wherein said holding portion extends from a lower edge of the base plate, wherein said retaining device further defines an outwardly extending blocking portion adapted to abut against an exterior face of the corresponding stopping arm when the corresponding locking arm is improper moved to an excessive inner position; wherein said blocking portion defines an upward extending tip; wherein both said holding portion and said blocking portion extend from a lower edge of the base plate, respectively, in an offset manner along a front-to-back direction perpendicular to both the lateral direction and the vertical direction; wherein the blocking portion intimately extends under the stopping arm.

* * * * *